(12) United States Patent
Choi et al.

(10) Patent No.: US 10,127,894 B2
(45) Date of Patent: Nov. 13, 2018

(54) SYSTEM FOR PROVIDING FONTS, APPARATUS FOR PROVIDING METAFONT FONTS, AND METHOD FOR CONTROLLING THE APPARATUS

(71) Applicant: FOUNDATION OF SOONGSIL UNIVERSITY INDUSTRY COOPERATION, Seoul (KR)

(72) Inventors: Jae Young Choi, Seoul (KR); Sung Min Kim, Seoul (KR); Ho Jin Lee, Namyangju-si (KR); Geun Ho Jeong, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 138 days.

(21) Appl. No.: 15/252,222

(22) Filed: Aug. 31, 2016

(65) Prior Publication Data

US 2018/0025703 A1    Jan. 25, 2018

(30) Foreign Application Priority Data

Jul. 20, 2016   (KR) ........................ 10-2016-0092001

(51) Int. Cl.
  *G09G 5/24*   (2006.01)
  *G06F 17/30*  (2006.01)
  *G09G 5/393*  (2006.01)

(52) U.S. Cl.
  CPC ......... *G09G 5/24* (2013.01); *G06F 17/30253* (2013.01); *G09G 5/393* (2013.01)

(58) Field of Classification Search
  None
  See application file for complete search history.

(56) References Cited

U.S. PATENT DOCUMENTS

2011/0093565 A1*  4/2011  Bacus ............... G06F 17/30905
                                                  709/219
2015/0348278 A1* 12/2015  Cavedoni .............. G06F 17/214
                                                  345/467

FOREIGN PATENT DOCUMENTS

JP         2735073 B2    4/1998

OTHER PUBLICATIONS

Korean Office Action dated Apr. 25, 2017 in connection with the counterpart Korean Patent Application No. 10-2016-0092001.
(Continued)

*Primary Examiner* — Xiao Wu
*Assistant Examiner* — Mohammad H Akhavannik
(74) *Attorney, Agent, or Firm* — Hauptman Ham, LLP

(57) ABSTRACT

A system for providing fonts, an apparatus for providing Metafont fonts, and a method for controlling the apparatus are disclosed. The disclosed apparatus, which connects to a device to provide Metafont fonts, includes: a communication module configured to receive a first font request from the device for the font engine, where the first font request includes at least one font style parameter and the ID information of a Metafont font file; and an operating module configured to determine whether or not a font file having ID information identical to the ID information of the font file included in the first font request exists in a first external memory, and if a font file having identical ID information exists, determine whether or not the font converted from the font file having identical ID information is saved in a second external memory.

7 Claims, 5 Drawing Sheets

(56) References Cited

OTHER PUBLICATIONS

Korean Notice of Allowance dated Oct. 31, 2017 in connection with the counterpart Korean Patent Application No. 10-2016-0092001.

* cited by examiner

SYSTEM FOR PROVIDING FONTS, APPARATUS FOR PROVIDING METAFONT FONTS, AND METHOD FOR CONTROLLING THE APPARATUS

CROSS-REFERENCE TO RELATED APPLICATIONS

This application claims the benefit of Korean Patent Application No. 10-2016-0092001, filed with the Korean Intellectual Property Office on Jul. 20, 2016, the disclosure of which is incorporated herein by reference in its entirety.

BACKGROUND

1. Technical Field

Embodiments of the present invention relate to an apparatus for providing fonts associated with Metafont, a method for controlling the apparatus, and a system for providing fonts using the same.

2. Description of the Related Art

Text is an effective method for recording and transferring information. With the wide spread use of smart devices, many users have come to prefer digital fonts for expressing text on a digital device over analog fonts such as handwriting. In this context, digital fonts of various styles are currently being produced.

Generally, an environment using digital fonts uses bitmap fonts and outline fonts. Support for such digital fonts may require a font engine, a typical example of which is the Freetype font engine for the open source Linux operating system.

FIG. 1 schematically illustrates the composition of a Freetype font engine.

Referring to FIG. 1, in order to readily provide fonts to the Freetype font engine, a fontconfig library is used, which searches, manages, and provides information on various fonts, and which is intended for bitmap fonts and outline fonts. Also, an Xft library operates between an application and fontconfig to allow easier use of fonts. The fontconfig library, which is available as open source, continues to incorporate suggestions from various developers and provide new features.

For conventional bitmap fonts and outline fonts, applying a particular style may require providing a font file for each style. That is, together with a basic style font, a group of other fonts, often called a 'font family', may be produced in tandem to express bold typeface, italics, and the like.

However, with an existing digital font, the style cannot be freely modified. Thus, a digital font such as that mentioned above may not satisfy all of the needs of the users in regard to font styles. That is, while there are highly varying demands for digital fonts, satisfying all of the demands for digital fonts requires a separate file for each style desired, making it difficult to implement digital fonts that satisfy all of the requirements.

Whereas it is difficult to modify the style for an existing digital font, as mentioned above, a Metafont font, which is a type of structural font, provides the advantage that the style can be freely modified. Metafont is a system for providing fonts used in TeX, where each letter can be regarded as comprising a 'function' for expressing how the letter is to be drawn and a 'style value' for depicting the letter. That is, the method by which the letter is to be drawn is fixed, but the value determining the style (style value) is separated, so that the font can readily be changed to a different style simply by changing the style value.

For example, when using a Metafont font, a user can change the font to have a thinner thickness compared to the default font by modifying the style value that determines the font's thickness, and a user can change the font to incline at a different angle by modifying the style value that determines the font's degree of inclination.

FIG. 2 shows an example of how fonts of various styles can be derived from a single Metafont font by altering the thickness and inclination. In FIG. 2, multiple styles are derived from one Metafont file, with examples shown for the alphabet letter 'A' and the Chinese character 'han' where two types of style values are varied. Thus, using Metafont fonts makes it possible to provide fonts of various styles, providing the user with greater levels of satisfaction.

However, in a current environment that uses digital fonts, such as the FreeType font engine, Metafont fonts cannot be used directly. That is, most font engines do not support Metafont fonts, and moreover, since Metafont is a program code, it is of a different format from that of existing digital fonts, which are designed as means of output.

SUMMARY OF THE INVENTION

To resolve problems in the related art such as that described above, an aspect of the present invention proposes an apparatus for providing fonts associated with Metafont, a method for controlling the apparatus, and a system for providing fonts using the same, with which fonts based on Metafont can be provided in real time without having to alter the device for a conventional font engine.

To achieve the objective above, an embodiment of the invention provides an apparatus which connects to a device for a font engine that does not support Metafont fonts to provide Metafont fonts to the device. The apparatus includes: a communication module configured to receive a first font request from the device for the font engine, where the first font request includes at least one font style parameter and the ID information of a Metafont font file; and an operating module configured to determine whether or not a font file having ID information identical to the ID information of the font file included in the first font request exists in a first external memory, and if a font file having identical ID information exists, determine whether or not font A is saved in a second external memory, where font A is obtained by converting the font file having identical ID information using the one or more font style parameter included in the first font request. The communication module may transmit save information of font A to the device for the font engine if it is determined that font A is saved.

The apparatus for providing Metafont fonts can further include a search module that is configured to search the ID information of at least one pre-existing Metafont font file in the first external memory and save the ID information as a list, so that the operating module can determine whether or not the font file having identical ID information exists in the first external memory by using the list provided from the search module.

If it is determined that a font file having identical ID information does not exist, the communication module can transmit information notifying that a font file having identical ID information does not exist.

The apparatus for providing a Metafont font can further include a converter module configured to convert a font file to a font using a font style parameter, where the converter module may convert the font file having identical ID information to font A by using the one or more font style parameter included in the first font request, if it is determined that said font A is not saved.

The communication module can transmit the converted font A to the second external memory, and can transmit the save information of the converted font A to the device for the font engine.

Also, another embodiment of the invention provides a method for controlling an apparatus which connects to a device for a font engine that does not support Metafont fonts to provide Metafont fonts to the device. The method may include: receiving a first font request from the device for the font engine, where the first font request includes at least one font style parameter and ID information of a Metafont font file; determining whether or not a font file having ID information identical to the ID information of the font file included in the first font request exists in a first external memory; determining whether or not font A is saved in a second external memory if a font file having identical ID information exists, where font A is obtained by converting the font file having identical ID information using the one or more font style parameter included in the first font request; transmitting the save information of font A to the device for the font engine if it is determined that font A is saved; and converting the font file having identical ID information to font A by using at least one font style parameter included in the first font request, if it is determined that font A is not saved, and transmitting the converted font A to the second external memory, and transmitting the save information of the converted font A to the device for the font engine.

Yet another embodiment of the invention provides a system for providing fonts. The system includes: a first device configured as a font engine that does not support Metafont fonts; a second device for providing Metafont fonts that is connected to the first device; a first memory device configured to save at least one font file; and a second memory device configured to save at least one font. The first device may receive a font request from a user and transmit it to the second device, the font request being any one of a first font request and a second font request, where the first font request may include at least one font style parameter and the ID information of a Metafont font file, and the second font request may be different from the first font request. The second device may determine whether the font request is the first font request or the second font request, determine whether or not a font file having ID information identical to the ID information of the font file included in the first font request exists in the first memory device if the font request is the first font request, determine whether or not font A is saved in the second memory device if a font file having identical ID information exists, and transmit the save information of font A to the first device if it is determined that font A is saved, where font A refers to a font obtained by converting the font file having identical ID information using the one or more font style parameter included in the first font request. The first device may read font A from the second memory device based on the save information of font A and may provide it to the user.

An embodiment of the invention provides the advantage that Metafont fonts can be provided in real time without having to alter the device for a conventional font engine.

Additional aspects and advantages of the present invention will be set forth in part in the description which follows, and in part will be obvious from the description, or may be learned by practice of the invention.

DETAILED DESCRIPTION OF THE INVENTION

In the present specification, an expression used in the singular encompasses the expression of the plural, unless it has a clearly different meaning in the context. In the present specification, terms such as "comprising" or "including," etc., should not be interpreted as meaning that all of the elements or steps are necessarily included. That is, some of the elements or steps may not be included, while other additional elements or steps may be further included. Also, terms such as "unit" or "module," etc., refers to a unit subject that processes at least one function or action, and such unit subject can be implemented as hardware or software or a combination of hardware and software.

Various embodiments of the present invention are described below in more detail with reference to the accompanying drawings.

First, a brief introduction is provided herein on conventional devices for providing fonts.

Freetype is a font engine that extracts information regarding fonts and uses an Xft library and a fontconfig library to make it easier for an application to request a font. Such libraries that support a font engine may collect the fonts' location information, unique meta information, style information, etc., of various fonts beforehand for use by the font engine, so that a font can be provided quickly when requested.

When an application transmits a font request to the Xft library, the Xft library may forward the font request to the fontconfig library. The fontconfig library may use commands internal operating commands to determine whether or not a requested font is installed, whether or not a font is installed with the desired style applied, whether or not it is saved in the cache in an outputable form, and if not in the cache, whether or not it should be converted and saved in an outputable form, and the like. Finally, when a font with the most similar style is selected from the installed fonts and transferred to the FreeType font engine, text may be outputted in the font style requested of the application.

Thus, the fontconfig library is a library operating for the FreeType font engine, and supports common fonts processed by the FreeType font engine. That is, the fontconfig library may support various font types such as TrueType, OpenType, Type1, CFF, PFR, BDF, etc., but may not support Metafont fonts.

The system for providing fonts, apparatus for providing Metafont fonts, and method for controlling the apparatus according to an embodiment of the invention will now be described below, building on the descriptions provided above.

Figure 1:
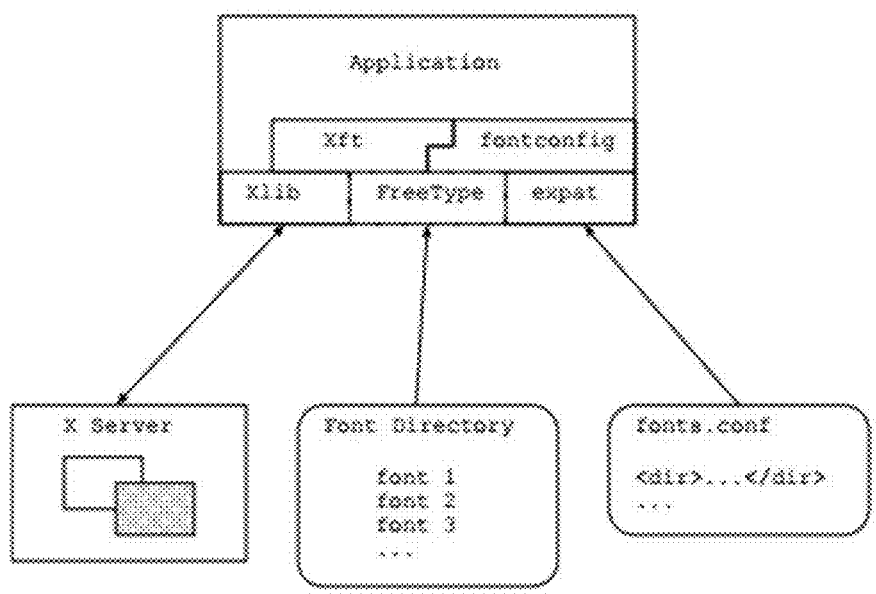
FIG. 1 schematically illustrates the composition of a Freetype font engine.
Figure 2:
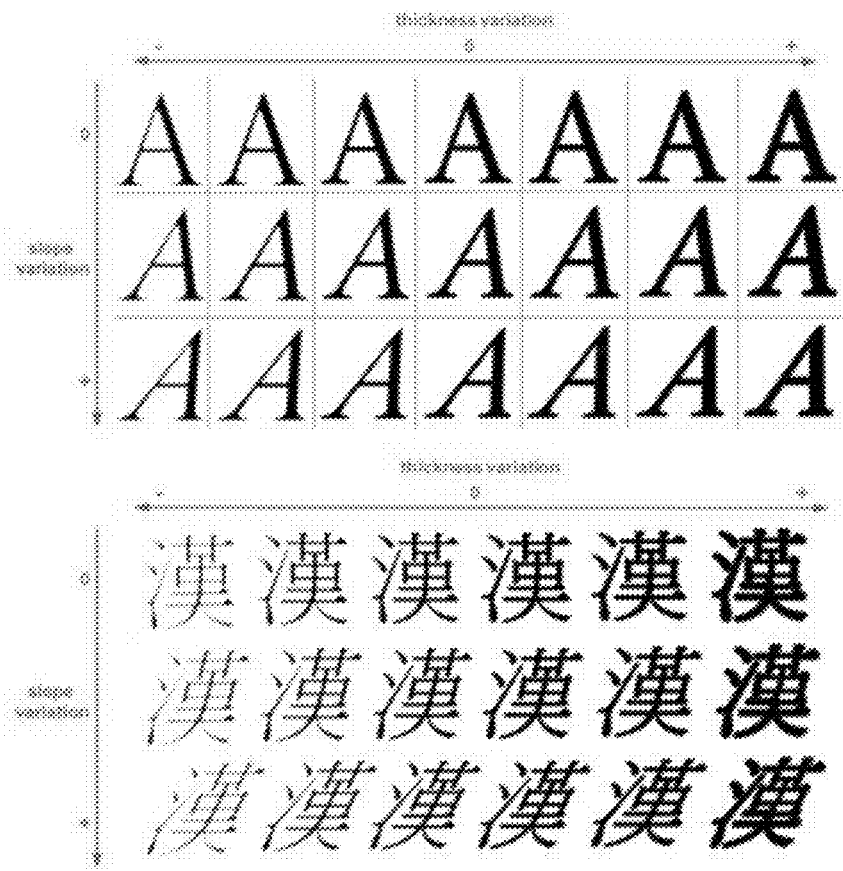
FIG. 2 shows examples illustrating the concept of a Metafont font.
Figure 3:
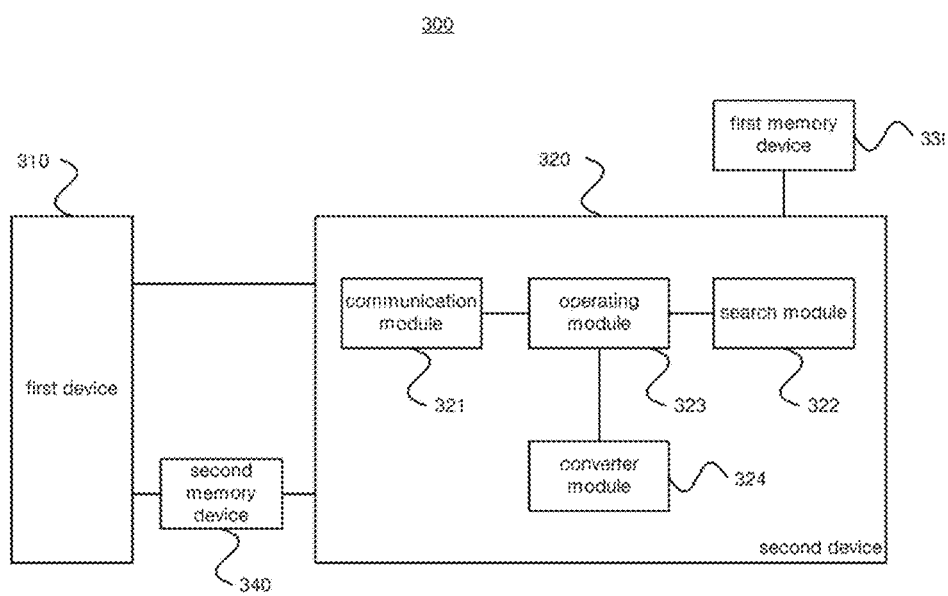
FIG. 3 schematically illustrates the composition of a system for providing fonts according to an embodiment of the invention.

FIG. 3 schematically illustrates the composition of a system for providing fonts according to an embodiment of the invention.

Referring to FIG. 3, a system 300 for providing fonts according to an embodiment of the invention may include a first device 310, a second device 320, a first memory device 330, and a second memory device 340.

The first device 310 can comprise a font engine and libraries that do not support Metafont, and may be configured to provide fonts based on font requests received from the user. That is, the first device 310 may be a conventional device for providing fonts that can provide fonts (TrueType, OpenType, Type1, CFF, PFR, BDF, etc.) other than Metafont fonts. For instance, the first device 310 can include the Freetype font engine, which operates on the Linux operating system, and the Xft library and fontconfig library that operate with the Freetype font engine.

The second device 320 may connect to the first device 310, for example via a plug-in or an add-on connection, to provide fonts associated with Metafont. Thus, if a first font request is inputted from the user, where the first font request is a font request requesting a Metafont-associated font, then the system 300 for providing fonts can have the first device 310 and the second device 320 cooperate to provide the font, and if a second font request is inputted from the user, where the second font request is a font request requesting a regular font (e.g. TrueType, OpenType, Type1, CFF, PFR, BDF, etc.) other than Metafont fonts, then the system 300 for providing fonts can provide the font using only the first device 310.

The first memory device 330 and second memory device 340 may be external memory devices as seen from the perspective of the second device 320, where the first memory device 330 may save at least one font file, and the second memory device 340 may save at least one font, i.e. outline font. Here, the font files saved in the first memory device 330 may include font files associated with Metafont fonts as well as regular font files other than Metafont font files, and likewise, the fonts (outline fonts) saved in the second memory device 340 may include Metafont fonts as well as regular fonts other than Metafont fonts. In one example, the second memory device 340 can be a cache memory device.

The second device 320 can include a communication module 321, a search module 322, an operating module 323, and a converter module 324. The function of each component is described below.

The communication module 321 may serve to interconnect the second device 320 and the first device 310, the first memory device 330 and the second memory device 340. For instance, the communication module 321 may receive a font request from the first device 310, transmit the processing results of the operating module 323 (described later on) to the first device 310, and transmit the font converted by the converter module 324 (described later on) to the second memory device 340. Also, the communication module 321 may further serve to determine whether a font request received from the first device 310 is a first font request or a second font request.

The search module 322 may serve to search for Metafont-associated font files that exist in the first memory device 330. Also, the search module 322 can save the ID information of Metafont font files pre-existing in the first memory device 330 as a list.

The operating module 323 may determine, based on the list provided by the search module 322, whether or not there exists in the first memory device 330 a font file having ID information identical to the ID information of the font file in the font request. Also, the operating module 323 may serve to determine whether or not the requested Metafont-associated font is saved in the second memory device 340.

The converter module 324 may serve to convert a Metafont font file to a Metafont font (outline font) by using font style parameters. Here, a font style parameter is a parameter for modifying the style of a font. The style of a font can include, for example, the kind of typeface, the thickness of the letters, the inclination of the letters, the serif of the letters, the gap between letters, line spacing, etc. The converted font may be transmitted via the communication module 321 to the second memory device 340.

Here, a module can refer to a functional, structural combination of hardware and software for operating the hardware for achieving the technical spirit of the present invention. For instance, a module can refer to a particular code and a logical unit of a hardware resource for executing said particular code. Those of ordinary skill in the field of art to which the invention pertains would easily understand that a module does not necessarily mean a physically connected code or a single type of hardware.

Figure 4:
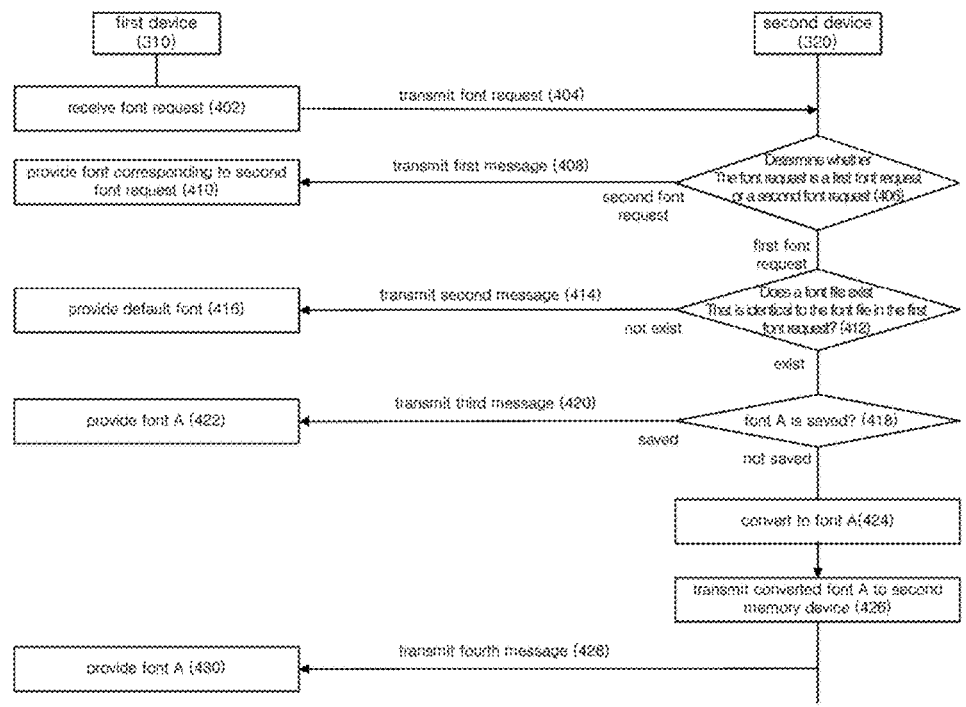
FIG. 4 is a flow diagram illustrating the operations of a system for providing fonts according to an embodiment of the invention.

FIG. 4 is a flow diagram illustrating the operations of a system for providing fonts according to an embodiment of the invention.

A detailed description is provided below, with reference to FIG. 3 and FIG. 4, on the function of each component and the operations performed in each step.

First, in step 402, the first device 310 may receive a font request from the user, and in step 404, the first device 310 may transmit the font request to the communication module 321 of the second device 320. Then, in step 406, the communication module 321 may determine whether the font request is a first font request or a second font request.

Here, the first font request may be a font request requesting a Metafont font and may include at least one font style parameter and the ID information of a Metafont font file. Here, the ID information of the font file can include the name, call information, metadata, etc., of the font file. Also, the second font request may be a font request requesting a regular font (TrueType, OpenType, Type1, CFF, PFR, BDF, etc.), not a Metafont font.

If the font request is a second font request, then the communication module 321 of the second device 320 may, in step 408, transmit information notifying that the font request is a second font request (a first message) to the first device 310. Then, based on said information (the first message), the first device 310 in step 410 may read a font corresponding to the second font request from the second memory device 340 and provide the user with the font by way of a rasterizer. As the first device 310 is a conventional apparatus for providing fonts, it is capable of providing fonts (TrueType, OpenType, Type1, CFF, PFR, BDF, etc.) other than Metafont fonts, and may operate in the same manner as in a conventional system. In this case, the second device 320 may not perform any operation.

On the other hand, if the font request is a first font request, then the operating module 323 of the second device 320 may, in step 412, determine whether or not there exists in the first memory device 330 a font file having ID information identical to the ID information of the font file in the first font request.

Here, the search module 322 of the second device 320 can generate and save a list of font files that have been saved beforehand in the first memory device 330, and the operating module 323 of the second device 320 can determine whether or not a font file having identical ID information exists in the first memory device 330 by using the list of the search module 322. Here, the list can include the names, call information, metadata, etc., of the font files.

If it is determined that a font file having identical ID information does not exist, then the communication module 321 of the second device 320 may transmit information notifying that a font file having identical ID information does not exist (a second message) to the first device 310 in step 414. Then, based on said information (the second message), the first device 310 in step 416 may read a preset default font from the second memory device 340 and provide the user with the font by way of a rasterizer.

Conversely, if there does exist a font file having identical ID information, then in step 418, the operating module 323 of the second device 320 may determine whether or not font A, which is the font converted from the font file having the identical ID information using at least one font style parameter in the first font request, is saved in the second memory device 340.

If it is determined that font A is indeed saved, then in step 420, the communication module 321 of the second device 320 may transmit the save information of font A (a third message) to the first device 310. Then, based on said information (the third message), the first device 310 in step 422 may read font A from the second memory device 340 and provide the user with the font by way of a rasterizer.

Conversely, if it is determined that font A is not saved, then in step 424, the converter module 324 of the second device 320 may convert the font file having the identical ID information to font A by using at least one font style parameter included in the first font request.

Figure 5:
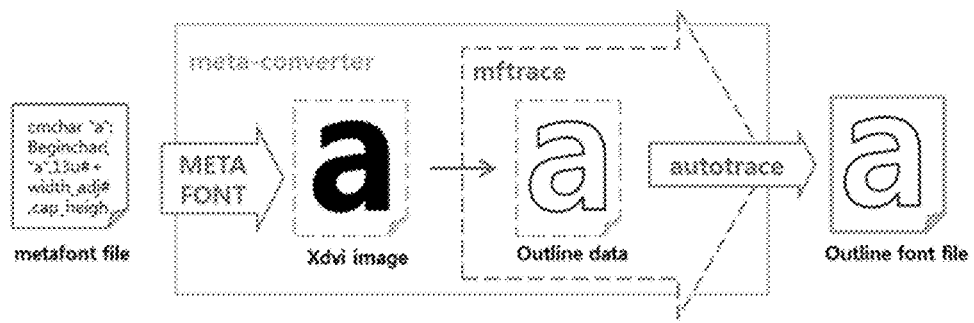
FIG. 5 conceptually illustrates how a font may be generated by a converter module according to an embodiment of the invention.

For example, generating font A can entail converting to an outline font format using at least one font style parameter, as illustrated in FIG. 5.

Then, in step 426, the communication module of the second device 320 may transmit the converted font A to the second memory device 340, and in step 428, the communication module 321 of the second device 320 may transmit the save information of the converted font A (a fourth message) to the first device 310. Furthermore, although it is not shown in FIG. 4, the search module 322 of the second device 320 may generate and save a list concerning the converted font A to allow use in subsequent occasions for providing fonts. Based on said information (the fourth message), the first device 310 in step 430 may read font A from the second memory device 340 and provide the user with the font by way of a rasterizer.

A system 300 for providing fonts according to an embodiment of the invention makes it possible to use Metafont in real time in a PC environment or a smartphone environment. Thus, the user can personally create a font having the required style. Also, in work related to producing fonts, the cost and time associated with designing and developing various fonts can be radically improved. Thus, the previously ineffective and repetitive work procedures involved in producing various styles of digital fonts can be improved, with reductions in development time and cost particularly for highly complex CJK fonts that are formed as combinations of consonants and vowels, and users can freely obtain fonts of various styles.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An apparatus configured to connect, via plug-in or add-on, to a font providing device that does not support Metafont fonts, and configured to provide the font providing device with a Metafont font in which a font style is set according to a user's request, the apparatus comprising:
    a communication module configured to receive a first font request from the font providing device, wherein the first font request is a font request requesting the Metafont font from the font providing device and includes at least one font style parameter and ID information of a Metafont font file;
    an operating module configured to, when a font file having ID information identical to the ID information of the Metafont font file included in the first font request exists in a first external memory, determine whether or not an outline font A is saved in a second external memory, wherein the outline font A is an outline font that has previously been converted by using a font style parameter identical to the at least one font style parameter; and
    a converter module configured to convert a font file to an outline font using a font style parameter,
    wherein,
        when the outline font A is saved in the second external memory, the communication module transmits save information of the outline font A to the font providing device,
        when the outline font A is not saved in the second external memory, the converter module converts the font file having the identical ID information and existed in the first external memory to the outline font A by using the at least one font style parameter and saves the converted outline font A in the second external memory, and the communication module transmits the save information of the converted outline font A to the font providing device, and
the font providing device reads the outline font A from the second external memory based on the save information of the converted outline font A and provides the outline font A to the user.

2. The apparatus according to claim 1, further comprising:
a search module configured to search for ID information of at least one pre-existing Metafont font file in the first external memory and save the ID information of the at least one pre-existing Metafont font file as a list,
wherein the operating module determines whether or not the font file having the identical ID information exists in the first external memory by using the list provided from the search module.

3. The apparatus according to claim 1, wherein when the font file having identical ID information does not exist in the first external memory, the communication module transmits information notifying that the font file having identical ID information does not exist to the font providing device.

4. A method for controlling an apparatus connecting, via plug-in or add-on, to a font providing device that does not support Metafont fonts to provide the font providing device with a Metafont font in which a font style is set according to an user's request, the method comprising:
receiving a first font request from the font providing device, wherein the first font request is a font request requesting the Metafont font from the font providing device and includes at least one font style parameter and ID information of a Metafont font file;
determining whether or not a font file having ID information identical to the ID information of the Metafont font file included in the first font request exists in a first external memory;
when the font file having identical ID information exists in the first external memory, determining whether or not an outline font A is saved in a second external memory, wherein the outline font A is an outline font that has previously been converted by using a font style parameter identical to the at least one font style parameter;
when the outline font A is saved in the second external memory, transmitting save information of the outline font A to the font providing device; and
when the outline font A is not saved in the second external memory, converting the font file having identical ID information and existed in the first external memory to the outline font A by using the at least one font style parameter included in the first font request, transmitting the converted font A to the second external memory, and transmitting the save information of the converted font A to the font providing device,
wherein the font providing device reads the outline font A from the second external memory based on the save information of the converted outline font A and provides the outline font A to the user.

5. A system for providing fonts, the system comprising:
a first device including a font engine that does not support Metafont fonts;
a second device configured to connect, via plug-in or add-on, to the first device and provide a user of the first device with a Metafont font in which a font style is set according to the user's request;
a first memory device configured to save at least one font file; and
a second memory device configured to save at least one outline font,
wherein the first device receives a font request from a user and transmits the font request to the second device, the font request is one of a first font request and a second font request, the first font request is a font request requesting Metafont font and includes at least one font style parameter and ID information of a Metafont font file, and the second font request is a font request requesting a font being different from the Metafont font,
wherein the second device
determines whether the font request is the first font request or the second font request,
when the font request is the first font request, determines whether or not a file having ID information identical to the ID information of the Metafont file included in the first font request exists in the first memory device,
when the font file having identical ID information exists in the first memory device, determines whether or not an outline font A corresponding to the font file is saved in the second memory device, and
when the outline font A is saved in the second memory device, transmits save information of the outline font A to the first device, and
when the outline font A is not saved in the second memory device, converts the font file having the identical ID information and existed in the first external memory to the outline font A by using the at least one font style parameter and saves the converted outline font A in the second external memory, and transmits the save information of the converted outline font A to the first device, and
wherein the first device reads the outline font A from the second memory device based on the save information of the outline font A and provides the outline font A to the user.

6. The system for providing fonts according to claim 5, wherein
the second device transmits, when the font request is the second font request, information notifying that the font request is the second font request to the first device, and
the first device reads a font corresponding to the second font request from the second memory device based on the information and provides the font to the user.

7. The system for providing fonts according to claim 5, wherein
the second device transmits, when the font file having identical ID information does not exist in the first memory device, information notifying that a font file having identical ID information does not exist to the first device, and
the first device reads a preset default font from the second memory device based on the information and provides the default font to the user.

* * * * *